March 11, 1947.  A. A. BELL  2,417,231
SAFETY CONTROL DEVICE FOR CLOSED HYDRAULIC SYSTEMS
Filed Oct. 13, 1945  2 Sheets-Sheet 1
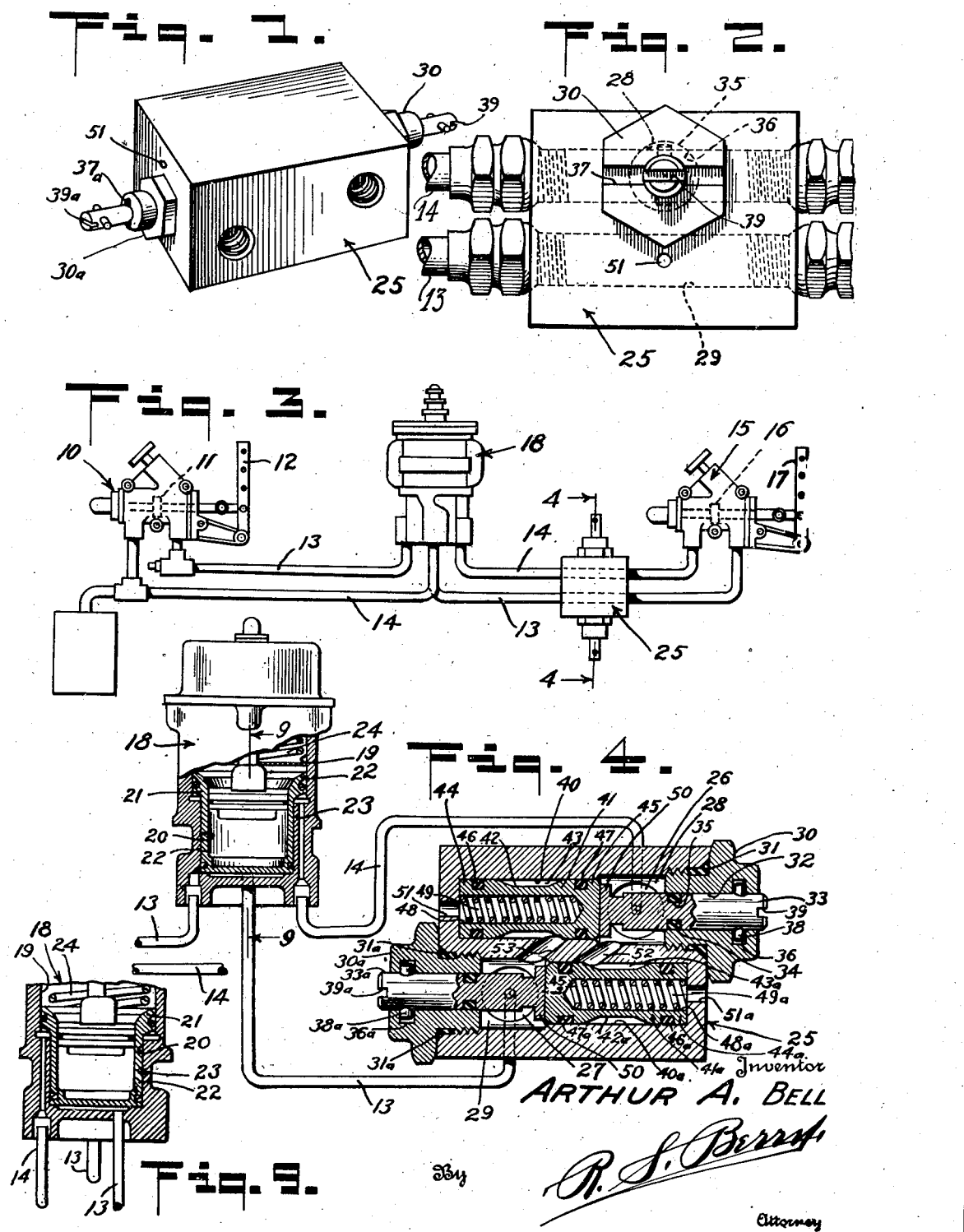
Inventor
ARTHUR A. BELL
By R. S. Berry
Attorney March 11, 1947.  A. A. BELL  2,417,231
SAFETY CONTROL DEVICE FOR CLOSED HYDRAULIC SYSTEMS
Filed Oct. 13, 1945  2 Sheets-Sheet 2
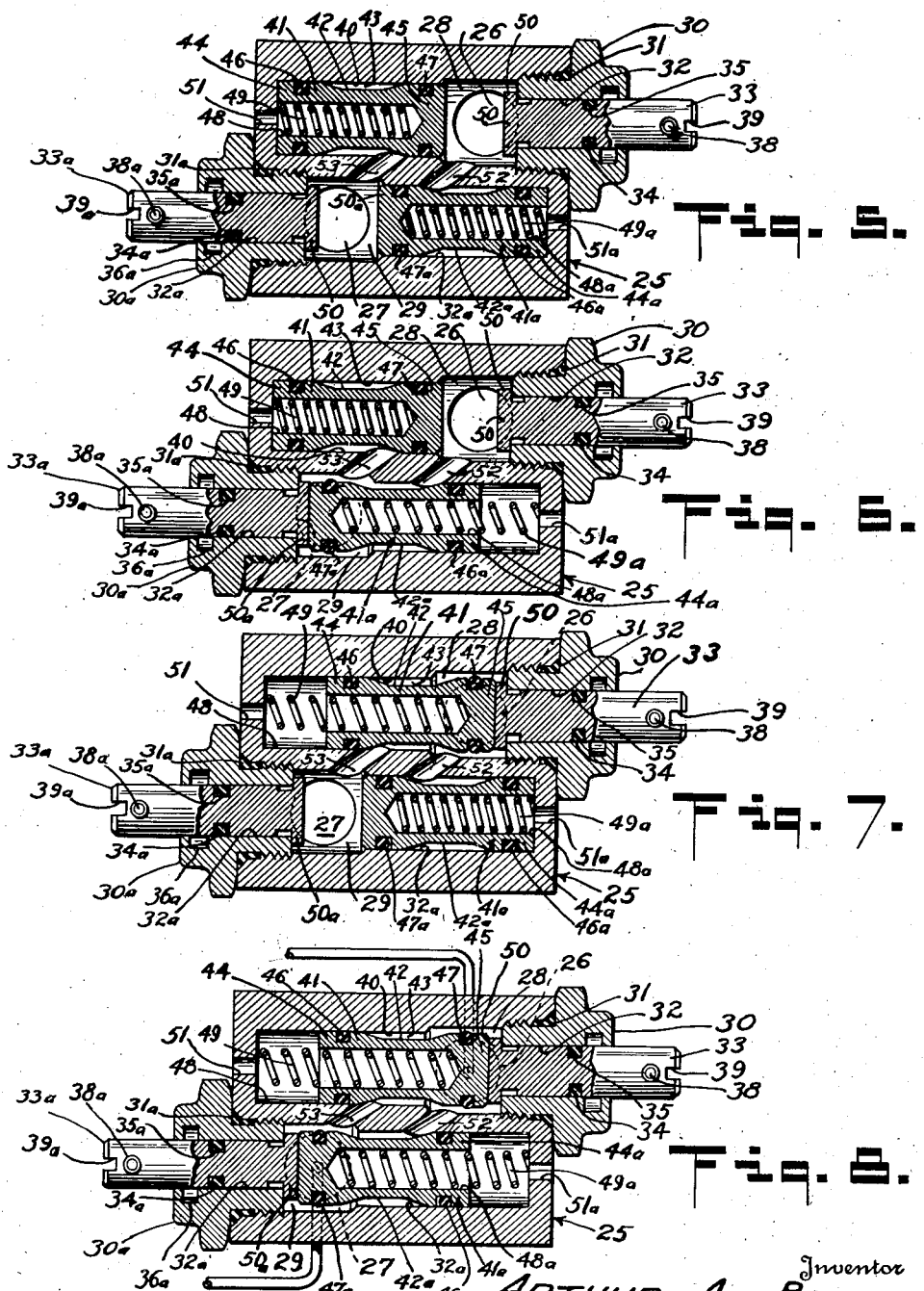

Patented Mar. 11, 1947

2,417,231

UNITED STATES PATENT OFFICE 2,417,231

SAFETY CONTROL DEVICE FOR CLOSED HYDRAULIC SYSTEMS

Arthur A. Bell, Santa Monica, Calif., assignor to Adel Precision Products Corp., a corporation of California Application October 13, 1945, Serial No. 622,167

4 Claims. (Cl. 60—54.5)

This invention relates generally to hydraulic motion transmitting systems, and more particularly to such systems of the closed type.

An object of this invention is to provide a closed hydraulic motion transmitting system and a device, which in its association with the master and motor units of the system, is automatically operable upon rupture of one or the other of the two fluid lines connecting the units in a closed circuit, to disable the entire system so that hydraulic locking of the system preventing manual or other operation of the unit will be eliminated, and the motor unit rendered freely operable manually or otherwise in order that control of apparatus being operated by the motor unit may be maintained.

Another object of this invention is to provide a device of the above described character which can be installed in a conventional hydraulic motion transmitting system of the closed type without necessitating any changes in the construction and arrangement of its units, and which is absolutely positive and dependable in its automatic operation of freeing the master unit for manual operation in the event of either line of the system being ruptured.

With these and other objects in view, the invention resides in the combinations, arrangements and functional relationships of elements as set forth in the following specification and particularly pointed out in the appended claims.

In the accompanying drawings,

Fig. 1 is a perspective view of one form of safety control device embodying this invention;

Fig. 2 is a view of the safety control device in end elevation;

Fig. 3 is a schematic view illustrating a closed hydraulic motion transmitting system with the safety control device embodying this invention installed therein;

Fig. 4 is an enlarged longitudinal sectional view of the safety control device taken on the line 4—4 of Fig. 3, and illustrating the device connected to the accumulator and pressure equalizer of the system, with the working parts of the device in the positions they occupy preparatory to filling of the system with fluid;

Fig. 5 is an enlarged longitudinal sectional view of the safety control device, similar to Fig. 4, with the parts of the device in the positions they occupy when the system is in normal operation;

Fig. 6 is a view similar to Fig. 5, and showing the positions of the parts when one line has been ruptured;

Fig. 7 is a view similar to Fig. 5, and showing the positions of the parts when the other line has been ruptured;

Fig. 8 is a view similar to Fig. 5, and showing the positions finally assumed by the parts upon rupture of either line; and Fig. 9 is a fragmentary sectional view taken on the line 9—9 of Fig. 4.

Referring specifically to the drawings, the invention in its illustrated embodiment is shown associated with a closed hydraulic motion transmitting system composed of a master unit 10 having the usual double-acting piston 11 actuated manually by a lever 12 and connected by fluid lines 13 and 14 to a motor unit 15 having a double-acting piston 16 operatively connected to an actuating lever 17 adapted to actuate any desired mechanism in response to actuation of the master lever 12, as will be fully understood by those familiar with the art.

An accumulator and pressure equalizer 18 has two coaxial cylinders or chambers 19 and 20 in which respectively work portions 21 and 22 of a common piston 23 normally urged by a spring 24 to one extreme position. The cylinders 19 and 20 are connected in series with the fluid lines 13 and 14, respectively, as shown in Figs. 4 and 9, so that under the action of the spring 24, both lines can be initially pressurized equally.

The safety control device embodying this invention comprises a generally rectangular body 25 having longitudinal fluid passages 26 and 27 therethrough in parallel relation and connected in series with the lines 14 and 13 respectively. Intersecting the passages 26 and 27 are transverse bores 28 and 29 in which are mounted parts of identical relief valving mechanisms, one for each of the lines 13 and 14, so that a detailed description of the parts of one mechanism will suffice for both. However, in order to distinguish like parts of the two mechanisms from each other, the reference characters designating the parts of one mechanism will be provided with exponents.

Each mechanism includes a screw plug 30 threaded into one end of the bore 28 and having a sealing gasket 31. The plug 30 is provided with a bore 32 in which is slidably and rotatably mounted a locking member in the form of a rod 33 having a pressure-responsive sealing ring 34 seated in an annular groove 35 in the periphery of the rod. The plug 30 is also provided with an annular recess 36 surrounding the rod 33, and with a diametric slot 37 intersecting the recess. A diametric pin 38 projects from the rod into the recess 36 to confine the rod against axial displacement from the pre-operating position shown in Fig. 4. The outer end of the rod is provided with a kerf 39 for a screw driver to enable the rod to be turned to a position in which the pin 38 can pass through the slot 37 and thus free the rod for axial movement outwardly to an operating position as will be later fully described.

At one side of the passage 26, the bore 28 has a portion 40 of reduced diameter constituting a cylinder or barrel in which works a piston valve element 41 having a central portion 42 of reduced diameter providing an annular chamber 43 between piston heads 44 and 45 at the ends of the element, which heads have sealing rings 46 and 47 respectively. The piston element 41 is provided with a longitudinal pocket 48 containing a compression spring 49 abutting the bottom of the bore portion 40 and constantly urging the piston element 41 axially towards the locking rod 33 for engagement of the piston head 45 with a head 50 on the inner end of the rod 33. A breather port 51 in the bottom wall of the bore portion 40 permits freedom of movement of the piston element 41.

The two relief valving mechanisms as above described are associated in a manner to be rendered interdependent operatively by the provision of connecting ports or by-passes 52 and 53 in the body 25. The port 52 connects the bore 28 with the reduced portion 40a of the bore 29, whereas the port 53 connects the bore 29 with the reduced portion 40 of the bore 28, all as shown in Figs. 4 to 8, inclusive, and for coaction in the operation of the invention which is as follows:

Let it be assumed that the accumulator spring 24 has been adjusted to predetermine the initial fluid pressure in the lines 13 and 14 of the system. With the parts of the safety control device occupying the positions shown in Fig. 4 wherein the locking rods 33 and 33a are releasably retained in their innermost or locking position shown in this figure, so as to compress the springs 49 and 49a and maintain the respective piston elements 41 and 41a seated in the bottoms of the respective bore portions 40 and 40a, the valve-forming piston heads 45 and 45a will disrupt communication between the lines 13 and 14 through the ports 52 and 53, so that the lines are independent of each other. The system is now filled with liquid which is pressurized the predetermined amount by the spring loaded piston 23 of the accumulator 18.

The locking rods 33 and 33a are now unlocked by rotating them sufficiently for their pins 38 and 38a to enter the diametric slot 37. As the pressure imposed by the equalizer piston 23 on the liquid in the system is greater than the force exerted by the springs 49, 49a, to move the piston elements, the latter will be held by such superior pressure against movement, whereas the rods 33 and 33a will be moved axially by the fluid pressure until their heads 50, 50a, respectively, engage the respective plugs 30, 30a as shown in Fig. 5, which illustrates the normal operating position of the parts.

Should the line 14 now be ruptured, with the consequent loss of pressure in the corresponding side of the system, the superior pressure in the other side of the system would, in the absence of this invention, be instantly applied to one side of the motor unit 15 with the attending movement of the piston 16 of this unit to the right as viewed in Fig. 3.

However, by the provision of this invention, the unbalanced condition created in the system by rupturing of the line 14 and the attending drop of pressure therein, will result in the piston element 41 being moved by its spring 49 to the right as viewed in Figs. 5, 6 and 7 inclusive, until this piston element engages the head 50 of the rod 33. This movement of the piston element 41 as a result of the pressure drop, will place the bore 29 in communication with the bore 28 through the port 53 as shown in Fig. 7, so as to permit fluid to flow freely from the other line 13 into the ruptured line 14, with the consequent draining of the line 13. The piston element 41a will now move to the left under the pressure of its spring 49a to also place the bore 28 in communication with the bore 29 through the port 52. As soon as the pressure has dropped sufficiently and both piston elements 41, 41a have been moved by their respective springs 49, 49a to their extreme positions shown in Fig. 8, the motor unit 15 will be relieved of all load imposed by hydraulic pressure in the system, and will thus permit free and unrestricted operation of any apparatus controlled by the motor unit, to be controlled manually from the motor unit or by other means.

Should the line 13 be ruptured, the above described final operation will take place, as the piston element 41a will now be moved by its spring 49a to its extreme left position shown in Fig. 6, to first place the bore 29 in communication with the bore 28 through the now opened port 52 as shown in this figure, whereby to permit fluid to flow freely from the line 14 into the ruptured line 13 with the consequent draining of the line 14 and the movement of the piston element 41 by its spring 49 so that both piston elements will occupy the final position shown in Fig. 8, and the motor unit 14 thus relieved of all hydraulic pressure in the system.

From the foregoing description, it will be manifest that by the provision of this invention, a closed hydraulic motion transmitting system will be caused to be completely disabled automatically whenever the fluid pressure in either line of the system drops below a predetermined pressure so as to permit manual or other form of control means to be put into use without any opposition from the hydraulic system.

I claim:

1. In a closed hydraulic motion transmitting system in which the fluid lines between a master unit and a motor unit are placed under an initial pressure, a safety control device comprising: a body having passages, one for each fluid line and adapted to be connected in series with the respective lines; said body having bores communicating with the respective passages, and ports connecting each passage with the other bore; piston elements mounted in said bores and having valving portions controlling said ports to normally close same under the action of fluid pressure in the respective lines maintaining said elements in one position; and springs urging the respective piston elements to a second position with a force less than that required to maintain the piston elements in said one position, and in which second said position the valving portions open the respective ports.

2. In a closed hydraulic motion transmitting system in which the fluid lines between a master unit and a motor unit are placed under an initial pressure, a safety control device comprising: a body having passages, one for each fluid line and adapted to be connected in series with the respective lines; said body having bores communicating with the respective passages; piston elements mounted in said bores and adapted to be maintained in one position by the fluid pressure in the respective lines; said elements having spaced heads; the body having ports connecting each passage with the other bore between the heads of the piston element therein when such element occupies the aforestated position; and springs urging the piston elements to another position wherein said ports place the passages in communication with each other.

3. In a closed hydraulic motion transmitting system in which the fluid lines between a master unit and a motor unit are placed under an initial pressure, a safety control device comprising: a body having passages, one for each fluid line and adapted to be connected in series with the respective lines; said body having bores communicating with the respective passages, and ports connecting each passage with the other bore; piston elements mounted in said bores and having valving portions controlling said ports to normally close same under the action of fluid pressure in the respective lines maintaining said elements in one position, springs urging the respective piston elements to a second position with a force less than that required to maintain the piston elements in said one position, and in which second said position the valving portions open the respective ports, locking members, one for each piston element, mounted in the body; and means for releasably retaining said locking members in positions wherein they lock the respective piston elements in said one position preparatory to filling the lines with fluid.

4. In a closed hydraulic motion transmitting system in which the fluid lines between a master unit and a motor unit are placed under an initial pressure, a safety control device comprising: a body having passages, one for each fluid line and adapted to be connected in series with the respective lines; said body having bores communicating with the respective passages, and ports connecting each passage with the other bore; piston elements mounted in said bores and having valving portions controlling said ports to normally close same under the action of fluid pressure in the respective lines maintaining said elements in one position, springs urging the respective piston elements to a second position with a force less than that required to maintain the piston elements in said one position, and in which second said position the valving portions open the respective ports, locking rods, one for each piston element rotatably and reciprocably mounted in the body in coaxial relation to the respective piston element; locking pins on the locking rods; and means with which said pins coact in one position of rotational adjustment of said rods, to hold same in locking engagement with the respective piston elements against the action of said springs and in said one position.

ARTHUR A. BELL.

REFERENCES CITED

The following references are of record in the file of this patent:

UNITED STATES PATENTS

| Number | Name | Date |
|---|---|---|
| 2,192,175 | Ballard | Mar. 5, 1940 |
| 2,368,659 | Heineck | Feb. 6, 1945 |